United States Patent [19]

Brooks

[11] Patent Number: 4,472,283

[45] Date of Patent: Sep. 18, 1984

[54] USE OF CARBON DIOXIDE TO REDUCE THE PH IN CIRCULATING HARD WATER

[76] Inventor: William W. Brooks, 15223 E. Pageland Cir., Fountain Hills, Ariz. 85268

[21] Appl. No.: 571,641

[22] Filed: Jan. 17, 1984

Related U.S. Application Data

[63] Continuation of Ser. No. 382,592, May 27, 1982, , which is a continuation of Ser. No. 966,516, Dec. 4, 1978, , which is a continuation of Ser. No. 850,189, Nov. 10, 1977, abandoned.

[51] Int. Cl.³ ............................................... C02F 5/12
[52] U.S. Cl. ..................................... 210/698; 210/755; 210/764; 210/765; 252/181
[58] Field of Search .................. 252/8, 307, 180, 181; 423/220, 226, 228; 426/477; 261/DIG. 7, DIG. 11, DIG. 46; 55/68, 84; 210/696–701, 749, 755, 764, 765, 766

[56] References Cited

U.S. PATENT DOCUMENTS

| | | | |
|---|---|---|---|
| 2,259,169 | 10/1941 | Little | 210/749 |
| 2,713,077 | 7/1955 | Rieve | 210/749 |
| 2,801,151 | 7/1957 | Nelson | 423/226 |
| 3,579,445 | 5/1971 | Tate | 210/749 |
| 3,658,463 | 4/1972 | Billings | 55/68 |

FOREIGN PATENT DOCUMENTS

| | | | |
|---|---|---|---|
| 948379 | 6/1974 | Canada | 423/226 |
| 2030430 | 12/1971 | Fed. Rep. of Germany | 210/749 |
| 959422 | 6/1964 | United Kingdom | 210/749 |

OTHER PUBLICATIONS

Betz Handbook of Industrial Water Conditioning, Seventh Edition, pp. 194–195 and 202–206.
The Merck Index, Eighth Edition, 1968, p. 226.
Amber-Hi-Lites, Rohm and Haas, Jul. 1974, No. 141.

*Primary Examiner*—Ernest G. Therkorn
*Attorney, Agent, or Firm*—Cates & Roediger

[57] ABSTRACT

The disclosure teaches a method of retarding the loss of carbon dioxide from a circulating water system by means of quaternary ammonium compounds having at least one hydrocarbon radical containing twelve or more carbon atoms or at least two hydrocarbon radicals each containing seven or more carbon atoms. In the method an effective amount of a suitable quaternary ammonium compound is added to the water in the system, surprisingly slowing the rate of loss of carbon dioxide from the water. Carbon dioxide is added to the water as needed to maintain the desired pH. The method provides an advantageous alternative to using stronger and more hazardous acids in maintaining a lowered pH in circulating water systems, for example, in heat exchange systems that utilize cooling towers.

15 Claims, No Drawings

USE OF CARBON DIOXIDE TO REDUCE THE PH IN CIRCULATING HARD WATER

This is a continuation of application Ser. No. 382,592, filed May 27, 1982, which in turn was a continuation of application Ser. No. 966,516, filed Dec. 4, 1978, which in turn was a continuation of application Ser. No. 850,189, filed Nov. 10, 1977, both now abandoned.

BACKGROUND OF THE INVENTION

The invention is a method for retarding the escape of carbon dioxide gas from a water system. It relates to methods of maintaining low pH levels in moving water systems in which some degree of aeration normally occurs, for example: cooling tower systems, swimming pool filtering systems, farm irrigation systems, and the like.

A prime example of the problems plaguing the prior art is to be found in the operation of a heat exchange system where cooling water containing dissolved solids (hard water) is pumped from the cooling tower basin through heat exchange means and then returned to the cooling tower to be trickled down again to the basin. In the last-named step considerable aeration and evaporation of the water occur in the tower. Due to evaporation the concentration of dissolved mineral solids in the water is increased.

When the concentration of the dissolved solids exceeds its solubility in the aqueous system, scale deposits on the surfaces of the system. For example, calcium carbonate scale builds up on the water side of the heat exchanger tubes when its solubility is exceeded.

The prior art workers learned that lowering the pH of the water in the system increases the solubility of calcium carbonate and other minerals in the water and this principle is used to permit the use of higher concentrations of dissolved minerals. However, an acid must be used to lower pH. (The resulting aqueous system then becomes corrosive, so a corrosion inhibiter such as chromate must be used to prevent damage to the system. (In this respect equations have been developed in the prior art that make it possible to predict whether water has a tendency to be corrosive or to be scale forming. For example, see "Cooling-Water Calculations", by R. G. Kunz, et al, Chemical Engineering, Aug. 1, 1977 and Nalco Reprint Summary No. 20 of an article by John W. Ryznar, Nalco Chemical Company, entitled "A New Index of Determining Amount of Calcium Carbonate Scale Formed by Water".)

The acid of choice in the prior art has been sulfuric acid. It is a cheap and plentiful acid—but dangerous. Because sulfuric acid is a strong acid and dangerous to store and use, attempts to substitute other suitable low cost acids have been made over the years. Carbon dioxide gas has been considered for use as an acid in circulating cooling tower water to control pH. If practical, it would provide a safe, economical alternative to the dangerous sulfuric acid. However, the prior art discounted the use of carbon dioxide because of the unacceptably high loss of carbon dioxide to the atmosphere when the water is pumped over the cooling tower. The unsuitability of carbon dioxide for this reason is noted on page 76, "Principles of Industrial Water Treatment", First Edition 1977, published by Drew Chemical Corporation, Boonton, New Jersey 07005, and page 195, "Handbook of Industrial Water Conditioning", 7th Edition 1976, published by Betz Laboratories, Inc., Trevose, Pa. 19047. As a result, the more dangerous sulfuric acid has continued to be the acid of choice in the prior art.

As can be seen, a felt need exists for a method of retarding the loss of carbon dioxide from circulating water to enhance the utility of carbon dioxide as a source of acid to lower and maintain pH. The invention hereafter described meets that need.

BRIEF SUMMARY OF THE INVENTION

I have discovered that when carbon dioxide gas and an effective amount of quaternary ammonium compound are used together in recirculating hard water such as, for example, cooling tower water, the escape or loss of carbon dioxide from the water is substantially retarded. On further experimentation I have found that the quaternary ammonium compound must have at least one hydrocarbon radical having twelve carbon atoms in the chain or, in the alternative, at least two hydrocarbon radicals having at least seven carbon atoms in each radical.

In another aspect of my method I control the pH of circulating hard water by adding amounts of carbon dioxide effective to achieve desired pH and one or more quaternary ammonium compounds as described in the preceding paragraph. This method retards the loss of carbon dioxide from a circulating water system. The rate of deposition of scale is controlled by lowering the pH of water to increase the solubility of dissolved solids such as calcium and magnesium salts. An additional advantage to my method is that tighter control of pH fluctuation can be maintained to avoid lowering the pH to such an extent that silicates will be precipitated.

The quaternary ammonium compound has the general formula

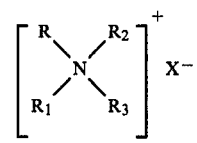

wherein R, $R_1$, $R_2$ and $R_3$ are hydrocarbon radicals, provided that at least one group has at least twelve carbon atoms or at least two groups have at least seven carbon atoms in each group; and X is an anion. The monovalent anions are preferred anions; whereas halides are more preferred anions and especially preferred are chloride and bromide.

As used in this disclosure, hard water refers to alkaline hardness such as imparted to water by the bicarbonate ion, wherein the degree of hardness is in proportion to the concentration of the ion. The hard water referred to is any water having a sufficient concentration of ion to benefit from treatment by this method.

DESCRIPTION OF THE PREFERRED EMBODIMENTS OF THE INVENTION

In the examples that follow the presently preferred embodiments are described.

EXAMPLE I

City tap water containing about 1000 ppm total dissolved solids was treated by bubbling carbon dioxide through the water by means of a sparger until the pH was depressed to a suitable value, which was recorded. Thereafter, a number of 500 millimeter samples of water were withdrawn and treated with 40 parts per million each of compounds to be tested for efficacy in retarding loss of carbon dioxide. In addition, an untreated sample of the pH-adjusted water containing no additives was used as a blank for comparison. At ambient temperatures and pressures each sample including the blanks was whipped for three minutes in an Osterizer blender set at low speed. The results are shown in Table I below.

TABLE I

| Sample | Conc. (ppm) | Initial pH | Final pH |
| --- | --- | --- | --- |
| Blank | 0 | 6.15 | 7.4 |
| S.B. 72 | 40 | 6.35 | 6.9 |
| Blank | 0 | 6.3 | 7.3 |

The data in Table I indicates that the quaternary ammonium compounds are effective in retarding the loss of carbon dioxide from the water. Rise in pH is proportional to the loss of carbon dioxide in the process.

The active ingredient of S.B. 72 is 12.5% n-alkyl dimethylbenzylammonium chloride wherein the alkyl moiety is a mixture comprising 60% $C_{14}$, 30% $C_{16}$, 5% $C_{12}$ and 5% $C_{18}$.

EXAMPLE II

The procedure of Example I was followed except that the initial pH of the water was driven to a slightly lower level. The results appear in Table II below.

TABLE II

| Sample | Conc. (ppm) | Initial pH | Final pH |
| --- | --- | --- | --- |
| Blank | 0 | 5.5 | 7.65 |
| S.B. 72 | 70 | 5.55 | 6.00 |

EXAMPLE III

The procedure of Example I was repeated in another series of tests using test compounds at 5 ppm with the results shown in Table III. Compositions 1412 and 1416 are Mason Chenical Company's MC1412 and MC1416 and both are alkyldimethylbenzylammonium chlorides, the principal difference being that the alkyl group distribution of 1412 is $C_{12}=40\%$; $C_{14}=50\%$; $C_{16}=10\%$ and the alkyl distribution of 1416 is $C_{12}=5\%$; $C_{14}=60\%$; $C_{16}=30\%$; $C_{18}=5\%$. Further details may be obtained from Mason Chemical Company's product specifications.

TABLE III

| Sample | Conc. (ppm) | Initial pH | Final pH |
| --- | --- | --- | --- |
| Blank | 0 | 5.5 | 6.9 |
| 1412 | 5 | 5.5 | 6.0 |
| 1416 | 5 | 5.5 | 6.0 |

The significance of the data in Example III is that the quaternary ammonium compounds are effective in retarding the loss of carbon dioxide when utilized even in very low concentrations.

In Example IV that follows an attempt was made to determine whether the effectiveness of the quaternary ammonium compounds persists over a period of time. Although there is no ready means of translating precisely the duration of time in the severely agitated environment of the Osterizer blender to persistence in actual-use environment such as the circulation of treated water through a cooling tower, nevertheless logically there is at least a rough correlation. The test indicates that compared to the blank (pH lowered by carbon dioxide but otherwise untreated) the water treated with as little as 5 ppm of the quaternary ammonium compounds is efficacious in significantly retarding the escape of carbon dioxide from the water.

EXAMPLE IV

The procedure of Example III was used except that the agitation of the samples was continued an additional seven minutes for a total of ten minutes. The results are shown in Table IV wherein it appears that the advantages persist.

TABLE IV

| Sample | Conc. (ppm) | Initial pH | pH (3 min) | pH (10 min.) |
| --- | --- | --- | --- | --- |
| Blank | 0 | 5.55 | 7.3 | 8.3 |
| 1412 | 5 | 5.5 | 6.1 | 7.5 |
| 1416 | 5 | 5.6 | 6.1 | 7.2 |

The following examples represent testing to determine the lower limits of concentration of test materials that can be effectively utilized in treating pH lowered carbonated water. Tables V and VI indicate that very little loss of efficiency is experienced in lowering the concentration down to 1.25 ppm, and even at 1 ppm a significant reduction of pH is still enjoyed.

EXAMPLE V

The procedure of Example I was followed except that the concentrations and initial pH of the test material were adjusted as shown in the table and the readings were taken after ten minutes, with results as shown in Table V.

TABLE V

| Sample | Conc. (ppm) | Initial pH | Final pH (10 min) |
| --- | --- | --- | --- |
| Blank | 0 | 5.5 | 7.7 |
| 1412 | 5 | 5.5 | 6.0 |
| 1416 | 5 | 5.5 | 6.0 |
| 1412 | 2.5 | 5.5 | 6.2 |
| 1416 | 2.5 | 5.6 | 6.2 |
| 1412 | 1.25 | 5.5 | 6.2 |
| 1416 | 1.25 | 5.5 | 6.2 |

EXAMPLE VI

The procedure of Example V was followed with additional 500 millimeter samples of varying concentrations (in parts per million). The results are shown in Table VI below.

TABLE VI

| Sample | Conc. (ppm) | Initial pH | Final pH (10 min) |
| --- | --- | --- | --- |
| Blank | 0 | 5.2 | 8.2 |
| 1416 | 10 | 5.2 | 6.7 |
| 1412 | 5 | 5.2 | 7.1 |
| 1416 | 5 | 5.2 | 7.2 |
| 1412 | 1 | 5.3 | 7.8 |
| 1416 | 1 | 5.3 | 7.8 |
| 1412 | .5 | 5.2 | 8.0 |
| 1416 | .5 | 5.2 | 8.0 |

Example VII following demonstrates that increasing the concentration of quaternary ammonium compounds above five to ten ppm does not retard the escape of carbon dioxide in proportion to the increase in concentration. However, there is some relationship demonstrated between the quantities employed and the results achieved.

EXAMPLE VII

The procedure of Example VI was followed. The results are shown in Table VII as follows:

TABLE VII

| Sample | Conc. (ppm) | Initial pH | Final pH (10 min) |
|---|---|---|---|
| Blank | 0 | 5.4 | 8.2 |
| 1412 | 5 | 5.4 | 7.0 |
| 1416 | 5 | 5.4 | 6.8 |
| 1412 | 10 | 5.4 | 6.6 |
| 1416 | 10 | 5.4 | 6.5 |
| 1412 | 25 | 5.4 | 6.4 |
| 1416 | 25 | 5.45 | 6.5 |
| 1412 | 50 | 5.2 | 6.2 |
| 1416 | 50 | 5.3 | 6.2 |

EXAMPLE VIII

The procedure of Example VII was followed using a variety of quaternary ammonium compounds. All concentrations of test materials were 5 ppm of solution. The results are shown in Table VIII listed by the trademark or common name for convenience.

CPC, Bretol, Cetol, Dibactol and Mytab are trademarks of Hexcel Fine Organics, Inc. Bretol is cetyldimethylammonium bromide; Cetol is cetyldimethylbenzylammonium chloride; CPC is cetylpyridinium chloride; Dibactol is myristyldimethylbenzylammonium chloride; and Mytab is trimethyltetradecylammonium bromide.

TABLE VIII

| Sample | Conc. (ppm) | Initial pH | Final pH (10 min) |
|---|---|---|---|
| Blank | 0 | 5.2 | 8.3 |
| Bretol | 5 | 5.2 | 6.5 |
| Cetol | 5 | 5.2 | 6.6 |
| CPC | 5 | 5.3 | 6.5 |
| Dibactol | 5 | 5.3 | 6.5 |
| Mytab | 5 | 5.3 | 6.9 |

EXAMPLE IX

The procedure of Example VIII was followed in testing a short chain quaternary ammonium compound. The results are shown in Table IX.

TABLE IX

| Sample | Conc. (ppm) | Initial pH | Final pH (10 min) |
|---|---|---|---|
| Blank | 0 | 5.2 | 8.1 |
| Tetraethylammonium bromide | 5 | 5.2 | 8.1 |

EXAMPLE X

The procedure of Example VIII was followed in testing the following quaternary ammonium compounds: 1-cocoimidazolinebenzyl chloride (UniQuat CB-50); didecyldimethylammonium chloride (Bardac 22); dioctyldimethylammonium chloride (Bardac LF); n-alkyl ($C_{14}$, 60%; $C_{16}$, 30%; $C_{12}$, 5%; $C_{18}$, 5%) dimethylbenzylammonium chloride and n-alkyl ($C_{12}$, 68%; $C_{14}$, 32%) dimethylethylbenzylammonium chloride (Bar Quat 4250-Z); and a mixture of octyldecyldimethylammonium chloride, dioctyldimethylammonium chloride and didecyldimethylammonium chloride (Bardac 20). These quaternary ammonium compounds can be obtained from Lonza, Inc. Fairlawn, N.J. The results are shown in Table X listed by their proprietary names:

TABLE X

| Sample | Conc. (ppm) | Initial pH | Final pH (10 min) |
|---|---|---|---|
| Blank | 0 | 5.2 | 8.1 |
| UniQuat CB:50 | 5 | 5.2 | 7.6 |
| BarDac 22 | 5 | 5.2 | 7.1 |
| BarQuat 4250-Z | 5 | 5.25 | 7.0 |
| BarDac LF | 5 | 5.2 | 6.9 |
| BarDac 20 | 5 | 5.2 | 6.9 |

Testing was again done to determine the performance of quaternary ammonium compounds at very low concentrations. The data indicates that the effective concentration of various quaternary ammonium compounds varies in that in individual cases the effective amount will be determined individually as a concentration of the treated water.

EXAMPLE XI

The procedure of Example VIII was followed using various quaternary ammonium compounds at concentrations of 1 ppm as test subjects. The results are shown in Table XI.

TABLE XI

| Sample | Conc. (ppm) | Initial pH | Final pH (10 min) |
|---|---|---|---|
| Blank | 0 | 5.4 | 8.3 |
| Dibactol | 1 | 5.4 | 8.1 |
| Cetol | 1 | 5.4 | 7.6 |
| Bretol | 1 | 5.4 | 7.7 |
| Mytab | 1 | 5.4 | 7.3 |
| CPC | 1 | 5.4 | 7.3 |
| BarQuat 4250-Z | 1 | 5.4 | 7.7 |
| BarDac 22 | 1 | 5.4 | 7.6 |
| BarDac 20 | 1 | 5.4 | 7.9 |
| BarQuat CB-50 | 1 | 5.5 | 8.2 |
| BarDac LF | 1 | 5.5 | 8.1 |

EXAMPLE XII

The procedure of Example VIII was followed except that the concentration of the test subjects in the carbonated water is in each case 2.5 ppm and the agitation was maintained for ten minutes. The results are shown in Table XII.

TABLE XII

| Sample | Conc. (ppm) | Initial pH | Final pH (10 min.) |
|---|---|---|---|
| Blank | 0 | 5.5 | 8.1 |
| Dibactol | 2.5 | 5.5 | 7.3 |
| Cetol | 2.5 | 5.5 | 7.4 |
| Mytab | 2.5 | 5.5 | 7.4 |
| Bretol | 2.5 | 5.5 | 7.0 |
| CPC | 2.5 | 5.5 | 7.1 |
| BarDac 20 | 2.5 | 5.4 | 7.1 |
| BarDac LF | 2.5 | 5.4 | 7.4 |
| BarDac 22 | 2.5 | 5.45 | 7.6 |
| UniQuat B-50 | 2.5 | 5.5 | 7.9 |
| BarQuat 4250-Z | 2.5 | 5.5 | 7.4 |

EXAMPLE XIII

A series of tests were performed on 500 millimeter aliquot parts treated with 25 parts per million of substances to be tested. The mix time was ten minutes. The results are shown in Table XIII.

TABLE XIII

| Sample | Initial pH | Final pH |
| --- | --- | --- |
| Blank | 5.5 | 8.4 |
| Cetol | 5.5 | 6.6 |
| Dibactol | 5.5 | 6.6 |
| Mytab | 5.5 | 6.6 |
| Bretol | 5.5 | 6.4 |
| CPC | 5.5 | 6.5 |
| BarQuat 4250-Z | 5.4 | 6.5 |
| BarDac 22 | 5.4 | 6.7 |
| BarDac LF | 5.4 | 7.0 |
| UniQuat CB-50 | 5.4 | 6.9 |
| BarDac 20 | 5.4 | 6.7 |

EXAMPLE XIV

The procedure of Example I was followed using in this case, however, deionized water treated with product to be tested in a concentration of 5 parts per million by weight. The results are shown in Table XIV.

TABLE XIV

| Sample | Initial pH | Final pH (10 min) |
| --- | --- | --- |
| Blank | 4.1 | 6.5 |
| Bretol | 4.1 | 5.8 |

EXAMPLE XV

The following test was conducted to determine the ability of quaternary amine to minimize loss of carbon dioxide from the cooling water in a seven and one-half ton cooling tower serving a refrigeration unit for cooling a 2200 square foot warehouse. The equipment includes a Lakewood Model 421 pH controller and recorder and total dissolved solids controller. $CO_2$ gas was fed from a cylinder through a pressure reducing valve followed by a rotameter. Feeding of $CO_2$ was regulated by the Lakewood instrument to admit gas periodically through a sparger installed in the cooling water circulating line downstream from the circulating pump. The Lakewood controller was set to maintain the pH value of the tower water as consistently at 8.5 as possible. The TDS controller was regulated to hold the TDS of the cooling water at 3200 ppm as compared to a value of 1000 ppm in the city water used for tower makeup. At intervals a bleed-off valve was actuated to discharge concentrated tower water to the sewer to maintain the TDS value of 3200 ppm in the tower water.

A chemical pump was plugged into the Lakewood instrument to accomplish feeding of supplementary chemical (in this case Mason Maquat 1416 (50%) dimethylbenzyl ammonium chloride) diluted with water and fed to the tower water.

An initial dosage of 75 ppm of the Mason quaternary, based on 200 gallons holding capacity of the tower, was fed to the tower water. The quaternary chemical was not fed until after the tower had operated several hours. An initial dosage of 8 ppm of AMP liquid phosphonate material was fed to the tower water at the beginning of the test to aid in preventing scale deposition in the heat exchanger of the refrigeration equipment. No further AMP was fed during the test.

The cooling water used in the test had a pH value of 8.5 and contained 3200 ppm total dissolved solids. The outside temperature was 92° F. The test results are shown in tabular form in Table XV.

TABLE XV

| Bleed-Off | | $CO_2$ Feed | | Quaternary 1416 Addition | |
| --- | --- | --- | --- | --- | --- |
| Time | Duration | Time | Duration | Time | Conc. |
| 1:45 | 3 min. | | | | |
| 2:08 | 2 min. | | | | |
| 2:29 | 3 min. | | | | |
| | | 2:55 | 45 Sec. | | |
| | | 3:04 | 57 Sec. | | |
| | | 3:16:50 | 50 Sec. | | |
| | | 3:27:05 | 50 Sec. | 3:27 | 75 ppm |
| 3:29 | 2 min. | | | * | |
| | | 3:38:50 | 60 Sec. | | |
| 3:40 | 2 min. | | | | |
| | | 3:48:05 | 52 Sec. | | |
| 4:17 | | | | | |
| | | 4:25:55 | | | |
| 4:40 | | | | | |
| | | 5:09:25 | | | |

*Automatic feeding of Quaternary 1416 set to maintain 75 ppm based on volume of blow down.

The average interval between feedings of carbon dioxide without the addition of a quaternary ammonium compound to the tower water was ten minutes and thirty-five seconds. The average interval between feedings of carbon dioxide with quaternary ammonium compounds was forty minutes forty seconds.

What is claimed is:

1. In a recirculating, aqueous system containing carbon dioxide as a pH modifier and subject to aeration, the method comprising the steps of lowering and maintaining pH by adding amounts of carbon dioxide effective to achieve a pH that controls the rate of deposition of scale by increasing the solubility of dissolved salts, and lowering the consumption of said carbon dioxide by adding to the system an uncrosslinked, water soluble quaternary ammonium salt having at least one hydrocarbon radical having twelve or more carbon atoms, or at least two hydrocarbon radicals each having seven or more carbon atoms, wherein the concentration of quaternary ammonium salts in the system is at least one-half part per million, whereby a substantial part of the carbon dioxide is retained in the system in active form from one cycle to another.

2. The method of claim 1 wherein the quaternary ammonium compound is n-alkyl-dimethylbenzylammonium chloride.

3. The method of claim 2 wherein the alkyl moiety is a mixture of alkyl radicals having from 12 to 18 carbon atoms in each radical.

4. The method of claim 1 wherein the quaternary ammonium compound is a mixture of n-alkyldimethylbenzylammonium chloride and n-alkyldimethylethylbenzylammonium chloride.

5. The method of claim 4 wherein the alkyl moiety of the quaternary ammonium compound comprises a mixture of alkyl radicals having from 12 to 18 carbon atoms in each radical and wherein the alkyl moiety of the dimethylethylbenzylammonium chloride is a mixture of alkyl radicals having from 12 to 14 carbon atoms in each radical.

6. The method of claim 1 wherein the quaternary ammonium compound is a mixture of octyldecyldimethylammonium chloride, dioctyldimethylammonium chloride and didecyldimethylammonium chloride.

7. The method of claim 1 wherein the quaternary ammonium compound is cetyldimethylethylammonium bromide.

8. The method of claim 1 wherein the quaternary ammonium compound is trimethyltetradecylammonium bromide.

9. The method of claim 1 wherein the quaternary ammonium compound is myristyldimethylbenzylammonium chloride.

10. The method of claim 1 wherein the quaternary ammonium compound is cetylpyridinium chloride.

11. The method of claim 1 wherein the quaternary ammonium chloride is 1-coco-imidazolinebenzyl chloride.

12. The method of claim 1 wherein the quaternary ammonium chloride is didecyldimethylammonium chloride.

13. The method of claim 1 wherein the quaternary ammonium chloride is dioctyldimethylammonium chloride.

14. The method of claim 1 wherein the concentration of quaternary ammonium chloride is at least about one-half part per million.

15. The method of claim 1 wherein the quaternary ammonium chloride is a mixture of octyldecyldimethylammonium chloride, dioctyldimethylammonium chloride and didecyldimethylammonium chloride.

* * * * *